US011194811B2

(12) United States Patent
Haft et al.

(10) Patent No.: US 11,194,811 B2
(45) Date of Patent: Dec. 7, 2021

(54) METHOD AND APPARATUS FOR PROCESSING A QUERY ON A PLURALITY OF OBJECT INSTANCES

(71) Applicant: XPLAIN DATA GMBH, Zorneding (DE)

(72) Inventors: Michael Haft, Zorneding (DE); Hanjo Täubig, Munich (DE); Christian Koncilia, Klagenfurt am Wörthersee (AT); Peide Wang, Heidelberg (DE)

(73) Assignee: XPLAIN DATA GMBH, Zorneding (DE)

( * ) Notice: Subject to any disclaimer, the term of this patent is extended or adjusted under 35 U.S.C. 154(b) by 0 days.

(21) Appl. No.: 16/650,047

(22) PCT Filed: Sep. 20, 2018

(86) PCT No.: PCT/EP2018/075469
§ 371 (c)(1),
(2) Date: Mar. 24, 2020

(87) PCT Pub. No.: WO2019/057819
PCT Pub. Date: Mar. 28, 2019

(65) Prior Publication Data
US 2020/0293522 A1 Sep. 17, 2020

(30) Foreign Application Priority Data

Sep. 25, 2017 (EP) ..................... 17192808

(51) Int. Cl.
*G06F 16/2455* (2019.01)
*G06F 16/2453* (2019.01)
(52) U.S. Cl.
CPC .... *G06F 16/2455* (2019.01); *G06F 16/24549* (2019.01)

(58) Field of Classification Search
CPC ...................... G06F 16/2455; G06F 16/24549
See application file for complete search history.

(56) References Cited

U.S. PATENT DOCUMENTS 7,577,681 B1    8/2009  Rozenman et al.
2005/0240966 A1* 10/2005  Hindle ............. H04N 21/25833
                                                    725/45

(Continued)

OTHER PUBLICATIONS van Zyl, Pieter, et al., "The Influence of Optimisations on the Performance of an Object Relational Mapping Tool," SAICSIT '09: Proceedings of the 2009 Annual Research Conference of the South African Institute of Computer Scientists and Information Technologists </doi/proceedings/10.1145/1632149>Oct. 2009 pp. 150-159.

(Continued)

*Primary Examiner* — Jay A Morrison
(74) *Attorney, Agent, or Firm* — Fox Rothschild LLP

(57) ABSTRACT

A computer-implemented method processes a query on instances of an object of an object-oriented environment. The object has a root object and member fields which are sub-objects of the root object. The root object and each sub-object correspond to an entity represented by and stored in form of a table. The method includes analyzing the query to identify those objects which are necessary to execute the query. For each of the primary key values of a table corresponding to a root object, the method includes:
(i) generating an instance of the object by populating the member fields of those objects which have been identified as necessary in said analyzing step with data identified by the respective primary key in their corresponding tables; (ii) executing the query on the generated object instance; and (iii) adding the query result to a result accumulator storage.

13 Claims, 7 Drawing Sheets

(56) References Cited

U.S. PATENT DOCUMENTS

| | | | | |
|---|---|---|---|---|
| 2009/0172042 A1* | 7/2009 | Bracha | ............... | G06Q 10/06 |
| 2011/0078201 A1* | 3/2011 | Ryan | ............... | G06F 16/2246 |
| | | | | 707/792 |
| 2014/0280375 A1* | 9/2014 | Rawson | ............... | G06F 16/21 |
| | | | | 707/803 |
| 2017/0068712 A1* | 3/2017 | Streufert | ............ | G06F 16/9535 |
| 2017/0116116 A1* | 4/2017 | Mittal | ............... | G06F 12/0253 |
| 2017/0293652 A1* | 10/2017 | Kevorkian | ......... | G06F 16/2453 |

OTHER PUBLICATIONS

Chen, Tse-Hsun et al., "Detecting Performance Anti-Patterns for Applications Developed Using Object-Relational Mapping," ICSE 2014: Proceedings of the 36th International Conference on Software Engineering </doi/proceedings/10.1145/2568225>May 2014 pp. 1001-1012.

* cited by examiner

METHOD AND APPARATUS FOR PROCESSING A QUERY ON A PLURALITY OF OBJECT INSTANCES

FIELD OF THE INVENTION

The present invention relates to a method and an apparatus for processing a query on a plurality of instances of an object.

BACKGROUND OF THE INVENTION

Databases nowadays mostly are implemented as so-called "relational databases", in which the data is organized in tables, a table being formed by columns and rows. Usually several tables together form a database, and the database may be accessed and queried by a program called database management system (DBMS). Sometimes the term database is also used for the combination of a database and the DBMS.

Using the DBMS and a query language, the database can be accessed to define the data schema, to manipulate the data and to query the database in order to extract the data of interest by a user. The by far most common query language is the "structured query language" SQL.

A typical application of a database is the storage and administration of patient data. FIG. 1 schematically illustrates the tables of such a database. One table is the "patient table". This table contains the "patient master data" for each patient, the basic data associated to the patient such as e.g. date of birth, gender, name, etc. The table has one row for each patient and several columns, where each column contains a certain piece of information about the various patients in the table. The table may have in the first column a unique ID identifying each patient. This unique ID is called a "key" (in some cases "primary key"), as it is uniquely identifying a record in this table.

In a second table, the "prescriptions table", there may be stored prescription information, i.e. drugs or medicines administered to a patient. Each row in this table corresponds to a prescription event (the event of a doctor administering a drug to a patient). In different columns it may hold the identifier ("ID") of the product which has been prescribed, the ID of the doctor who has issued the prescription, the date of the prescription, the price of the prescribed product, and it also contains the ID of the patient, who has received this prescription. For simplicity, FIG. 1 does not show different columns, and for better illustration, different patients are distinguished by different patterns. The patient ID identifies patients stored in the patient table. While it is a "key" in the patient table it is called "foreign key" in the prescription table, as the same key may appear in multiple rows of this table. One can see that in the example of FIG. 1: the patient highlighted by the striped pattern in the patient table has two corresponding entries in the prescriptions table, i.e. this patient has received two prescriptions. It will be understood that—for millions of patients—the prescriptions table may contain billions of rows. Also—for simplicity—the figures do not depict additional "dimension tables", i.e. tables where—via the ID of the doctor or the ID of the prescribed product—additional attributes of the doctor or the prescribed product can be looked up (such as the specialty of the doctor or the manufacturer of the product).

In Business Intelligence terms the prescription table is often termed a "fact table"—it is the center part of a star schema or a snowflake schema. The foreign keys in the fact table "point" into the dimension tables grouped around the fact table. The patient table may be considered as one such dimension table.

A single table or a Star schema isn't a problem for today's database technologies—even if it has billions (!) of rows stored in the fact table—as long as records can be processed independently: one record after the other with no reference to a "previous" record (or a record in another fact table). As an example, scanning a single table with billions of rows to sum total costs of a medication is a task which most databases can do within a few seconds or less.

If, however, the rows in a big table are not to be processed "independently", relational databases soon run into problems. As an example, one may consider the task to sum only costs for prescriptions which are associated to a therapy start of a patient, where therapy start means no previous prescription for the same patient with the same drug. Whether to count a prescription depends on other prescriptions of the patient, or—in other words—on the patient as a whole. In this case the database would first need to collect all prescriptions of a patient which are potentially vastly "distributed" across the billion of other records in the table. "Finding and collecting" the relevant rows (grouping rows into patients) can get very time consuming. The situation gets even worse if the information concerning a certain patient is not only distributed across one or two but over many tables as e.g. illustrated in FIG. 2. Therein the information related to the patient marked with the "striped" pattern is distributed over the tables "prescriptions", "diagnoses", "procedures" (e.g. treatments the patient has received) and others. Each of those "fact tables" may have billions of rows.

Technically a "join" between multiple huge tables is needed. Analysts working with relational databases often experience that complex joins between big tables quickly run into performance problems—no matter how fast the database is on a single table. An example query illustrating such a problem might be: For a set of 100 million patients with 2 billion prescriptions in one table and 2 billion diagnoses in a second table: Sum the prescription costs for patients after repeated (second) diagnosis of hypertension. Such a query is computationally extremely expensive and will keep a relational database busy for quite a while even if state of the art hardware and database technology is used. Even more complex queries often do not return even after hours or completely fail.

It should be noted that databases can certainly collect information for a single patient or single customer "quickly"—that is what happens for example if a user logs into his account of a typical online shop, then the user gets all his data displayed in a second. If one assumes, however, that getting all data for a single patient from different tables takes 1 ms (which is very optimistic even if indices are used), then analyzing 100 million patients will take 100.000 seconds>27 hours). This is a significant problem if relational databases are used for analytics purposes to statistically analyze large datasets. The term "analytics" here doesn't mean accessing single patients, but collecting complex statistics for millions of patients in a second.

As schematically illustrated in FIG. 3, relational databases "scatter" data which belong to a specific entity of interest (the patient) across many tables. Analyzing patients holistically means re-collecting data, i.e. to carry out computationally expensive joins, which is in particular cumbersome with SQL as the "analysis language". In FIG. 3, data of two different patients is illustrated, the data of a first patient being illustrated by the striped pattern with the stripes from upward left to downward right, the data of the other patient being identified by the striped pattern with the stripes from downward left to upward right.

As a way out of that one might simply do the "joins" upfront—i.e. collect all information which belongs to the object in focus of the analysis upfront and store millions of object instances (patients in the present examples) as whole entities. This is depicted in FIG. 4, and this is largely what object-oriented databases do. Beyond that they allow application developers to immediately work with those object instances, e.g. in terms of object-oriented programming languages such as Java or C++.

The conceptual difference between a tabular storage of data and an object-oriented representation (or view) of the data is important for the following and therefore further elaborated. Tabular storage means the entity patient is represented by a row in the patient table; additional information has to be looked up in other tables using keys. An object-oriented approach is different in the fact that a patient is not primarily represented as a "row", but with the object "Patient" all the prescriptions, diagnosis etc. already come along with it. The abstract definition of the object "Patient" might look like (denoted as a Java classes and simplified):

```
public class Patient {
    Long patientID;
    String name;
    String gender;
    Date dateOfBirth;
    List<Diagnosis> diagnoses;
    List<Prescription> prescriptions;
}
```

I.e. the object "Patient" has member fields holding information on the ID of the patient, the name, gender and date of birth of the patient. Furthermore, there are member fields holding lists of sub-objects, i.e. a list of "Diagnosis" and a list of "Prescription". Those objects might in turn be defined as:

```
public class Diagnosis {
    String diagnosisName;
    Date dateOfDiagnosis;
    String physicianName; // or an ID
}
public class Prescription {
    String productName; // or an ID
    String prescriberName; // or an ID
    Integer prescribedAmount;
    Date prescriptionDate;
}
```

The term object refers to its abstract definition. A concrete object instance is the patient "Hans Maier", which might look like (in a JSON notation/Java Script Object Notation):

```
{
    patientID : "12345",
    name : "Hans Maier",
    gender : „male",
    dateOfBirt : "07-02-1972",
    diagnoses : [
        {diagnosisName: "Hypertension", date: "12-02-2011",
        physician: "Dr. Max"},
        {diagnosisName: "Heart Failure", date: "11-06-2015",
        physician: "Dr. Smith"}
```

```
    ],
    prescriptions : [
        { productName: "Aspirin", amount: 2, date: "11-06-2015",
        prescriber: "Dr. Smith"},
        { ... }
    ]
}
```

As a part of the object instance "Hans Meier" the prescriptions and diagnoses of Hans Meier are available as member fields. Having access to whole objects evidently has some advantages.

Such an object-oriented access to data can be facilitated in different ways: Using "Object Relational Mappers", data is still stored in a relational schema but there is an automated mapping between the tables and columns in the database and the fields of an object. An object relational mapper just makes it more convenient to populate object instances, manipulate and save them again, but otherwise object relational mappers suffer from the same performance problems as the underlying relational database in case of analytics.

The contrary approach of object-oriented databases is to store entire objects instances—the above object instance "Hans Meier" for example might simply be stored as one long JSON string (or in a binary format). This approach is depicted in FIG. 4. In this figure, there are two patients shown exemplarily, patient 1 and patient 2, with their corresponding object instances, instance 1 and instance 2. For patient 1 all information related to that object instance is stored in one "block" of information, which is labelled "object 1". Successive blocks contain successive objects, as is illustrated for object 2, which contains all information related to patient 2. Once these object instances have been generated they can be read instance by instance without expensive joins.

Storing whole objects seems to be a perfect solution in cases where objects have to be analyzed holistically. In typical scenarios, however, objects are becoming very complex with many entities and recursive sub-entities. Storing such complex objects will have at least two severe disadvantages:

As object instances are stored as a whole, they need to be retrieved (read) as a whole, even if for some specific analytics only specific parts of an object are required. It results in the need that for each potentially even simple query the entire object store needs to be scanned.

If during live cycle of a database additional sub-objects become available and need to be added to an object, the entire object database needs to be rebuilt.

As a side remark it should be mentioned: There are approaches in-between the two edge cases of tabular and object-oriented storage: Different object parts are stored in different "collections", and these object parts can be joined via keys. In any case, however, one has to make a decision at the time one designs the data model (prior to any analytics) on which parts to store together in an object, and which other parts to join using keys.

As a bottom line one may summarize the introduction of existing approaches as follows:

For statistically analyzing "complex objects", evidently an object-oriented access to data is preferable.

Existing tabular, relational storage systems are not a feasible basis as object instances are scattered across many tables and have to be assembled in an expensive process (expensive joins via keys).

Exiting object-oriented storage systems aren't a solution either, as for different queries only different specific parts of an object are required, however objects will always be retrieved as a whole (or as object-parts defined at design time of a database).

SUMMARY OF THE INVENTION

According to one embodiment, there is provided a computer-implemented method of processing a query on a plurality of instances of an object of an object-oriented environment, wherein said object has a root object and a plurality of member fields, among which a plurality themselves are objects thereby being sub-objects of said root object, wherein said root object and each sub-object correspond to an entity represented by and stored in form of a table, wherein said tables are tables on accordance with a relational model of data, and wherein each of said tables corresponding to said root object or to one of said sub-objects has been sorted in accordance with the primary key of the table corresponding to said root object, said method comprising: Analyzing said query to identify those objects among said root object and said sub-objects, which are necessary to execute the query, for each of the primary key values of the table corresponding to said root object: i) generating an instance of said object by populating the member fields of those objects among said root object and said sub-objects, which have been identified in said analyzing step, with the data identified by the respective primary key in their corresponding tables; ii) executing the query on the generated object instance; ii) add the result computed on said object instance to a result accumulator storage. In this manner the object instances can be generated quickly and sparsely, thereby achieving a high efficiency and a high performance in data analysis.

According to one embodiment said step of identifying those objects, which are necessary to execute the query, comprises identifying the member fields, which are explicitly or implicitly referred to in said query; identifying the objects, which correspond to the identified member fields, as those objects, which are necessary to execute said query.

In this manner the determination of the relevant member fields for populating the object instances can be determined based on the query so that based on the query analysis tailored object instances can be generated.

According to one embodiment only those member fields, which have been identified in said identifying step, are populated with data from their corresponding tables.

This enables the generation of sparse objects and the fast execution of the query.

According to one embodiment, the query logic is executed on an object instance as soon as it has been generated and the result is then stored in or added to a result storage, and once the object instance has thus been processed, the associated memory of said instance is freed or the instance is made available for re-usage, and the method proceeds with the generation of the next object instance, executing the query on the next instance, and then in turn storing or adding the corresponding result into the result storage:

In this manner storage can be used efficiently and the process can be executed fast.

According to one embodiment, when an object is a sub-object in a nested object hierarchy such that it is a sub-object at an n-th sub-level of the root object, then the table corresponding to such a n-th sub-level sub-object is sorted a) using the key of the table corresponding to the primary key of the root object as a primary sorting criterion, b) using the further keys of the table of the object corresponding to the n-th sub-level as further sorting criterions in accordance with the object hierarchy, where a key which corresponds to a higher rank in the hierarchy corresponds to a higher rank sorting criterion.

This enables the sparse population of the object instances in a nested object hierarchy.

According to one embodiment, populating an object instance member field comprises using a pointer which points to the row or the rows of the table to be inserted into a specific object instance and writing said pointer into the object instance.

This enables a fast population of the object instances, since only the pointers need to be written.

According to one embodiment, if one of the child entities found relevant by said analyzing step in turn has relevant children, then the object instance generation is recursively continued such that sub-object instances are populated in the same manner with rows or blocks of rows from of tables corresponding to the relevant children.

In this manner the approach processes all objects as a whole step by step until the whole database has been analyzed.

According to one embodiment, said method proceeds further to generate object instance by object instance in correspondence with the keys based on which the tables corresponding to the objects have been sorted, until one object instance has been generated for each key value of the root entity.

This further defines how the approach proceeds based on the keys as a sorting criterion.

According to one embodiment in a table sorted according to said primary key of the root object, possibly according to further keys as further sorting criteria, there is provided an indexing data structure comprising pointers which respectively point at the beginning of each block having the same key, or point to one or more sub-blocks identified by further keys, said indexing structure preferably further comprising information on the length of each block identified by a pointer.

This enables a fast population of the object instances by hooking a pointer or index into the object instances. The provision of the block length also enhances the speed of reading and thereby the speed of populating the object instances.

According to one embodiment the method further comprises: providing a reading mechanism, which reads simultaneously multiple tables, and which further does not proceed with the reading of a next block of a table, the next block corresponding to a next key used as sorting criterion, until the corresponding row or block of rows of the other tables identified as necessary have been read.

This enables a quick reading of the tables and thereby increases the overall speed of the analysis.

According to one embodiment, the method further comprises: Implementing said method by n processes or threads, wherein the values of keys used as sorting criterion are split into n subsets, each consisting of a set of sequentially ordered values of said key, and wherein a first process or thread reads data corresponding to the first subset of the values of said keys; a second process or thread reads data corresponding to the second subset of the values of said keys; and an n-th process or thread reads data corresponding to the n-th subset of the values of said keys.

The implementation in parallel threads increases the overall speed.

According to one embodiment, the method further comprises: Generating an aggregation container for each subset, said aggregation container including a method, which generates for each object instance in said subset a result, which adds to the result stored in a result container corresponding to said subset; fusing by a fusing method the results on said subsets of objects contained in said result containers into an overall result.

This enables the execution of algorithms in a parallel way on multiple cores or processors.

According to one embodiment, the query is formulated in an object-oriented query language.

This enables an object-oriented querying of very large databases.

DETAILED DESCRIPTION

Figure 1:
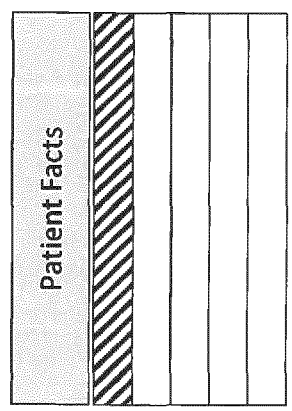
FIG. 1 schematically illustrates database tables.
Figure 1:
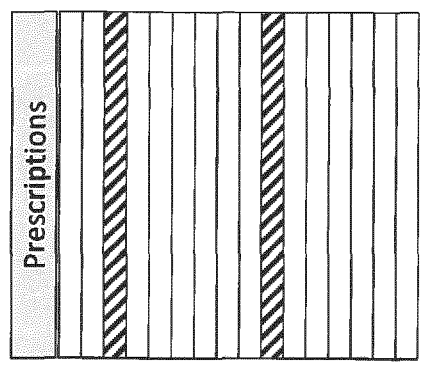
Figure 2:
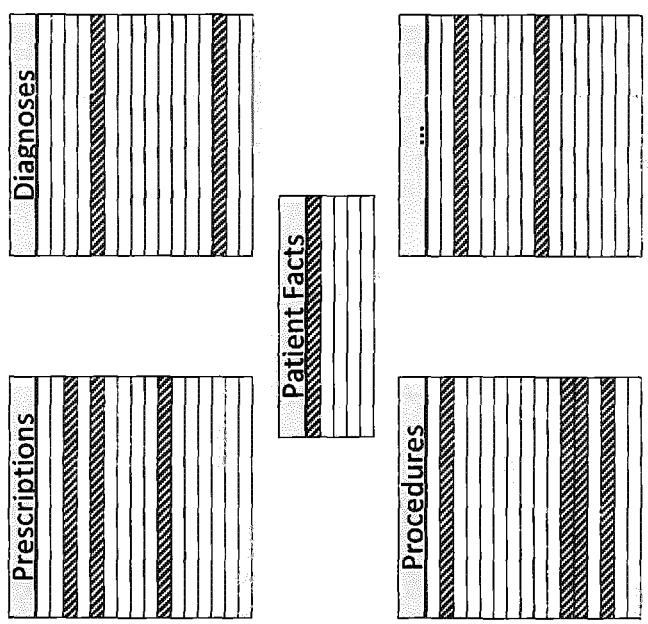
FIG. 2 schematically illustrates further database tables.

According to one embodiment, there is provided an approach, which enables the querying of very large datasets, which represent complex objects, very quickly.

Embodiments disclosed herein aim at following:

There is offered a novel way how to organize and store data which allows an object-oriented access to stored data.

Thereby embodiments described herein offer an extremely fast object iterator ("iterator" denotes a means to cycle through all or a large subset of stored objects instances), which—depending of the structure of a query—touches only those parts of the data and adds them to an object instance which are relevant for a specific query. How the object is built is determined at analysis time (once a query comes in—different for each different query), not at design time of the database. This may be called a "sparse object iterator".

These and other features and advantages will become more apparent from the following detailed description.

Before turning to a more detailed description of embodiments, a word on the notations used in the following will be helpful, and how terms used in the domain of relational databases map to equivalent terms used in an object-oriented terminology:

In the above example, the object in focus of analysis is the "Patient". In object-oriented terminology or an object-oriented environment, an object has "member fields", often also called "variables" (e.g. in Java) or "properties" (in JSON) of the object. A property of the object "Patient" may be the "Gender" (with potential values "male", "female" and "unknown"). Member fields of an object may be variables of different type (or arrays/lists of such types), or may in turn be objects (or arrays of objects). The object "Patient", for example, may have member fields storing hospital cases, where the "Hospital Case" in turn is a complex object with individual member fields and potential further sub-objects.

The relationship can be depicted as a hierarchy or tree of objects. In the following the object at the root ("Patient") also often is called the root object or the object in focus of analysis.

Individual object elements usually have their counterpart as corresponding tables in a database or as tables in accordance with a relational model of data. Such a model organizes data into one or more tables (or "relations") of columns and rows, with a unique key identifying each row. Rows are also called records or tuples. Columns are also called attributes. Generally, each table/relation represents one "entity type" (such as the type patient or prescription). The rows represent instances of that type of entity (such as individual patients and individual prescriptions) and the columns representing values attributed to that instance (such as name and gender of the patient or name and dose of the drug). Each row in such a table representing an entity has a unique key. If we want to emphasize that a column holds a unique key identifying one of the entities of a relational model we will use the term "primary key" in this document. (The term "primary" is sometimes used with a little different meaning in other places.) Rows in a table can be linked to rows in other tables by adding a column for the unique key of the linked row. The columns in such linked tables are termed as "foreign keys".

In the example described herein in detail, the "Patient" (without its sub-objects) corresponds to a table in the database where the patient ID is a key (or a primary key in our terminology). Further tables may correspond to other object elements (sub-objects of the root object). Corresponding keys define the "entities" (or more precisely the entity instances) which are stored in those tables, and—in the database world—an "entity relationship diagram" depicts the relations of those entities in terms of keys and foreign keys.

Usually an entity in a database (with its corresponding table with a primary key) maps to a corresponding object (without its sub-objects). Columns in this table (also often called fields or dimensions and measures) correspond to the properties of an object. An object may be seen as being composed of different entities (see for example the FIG. 6 for an object with a number of different entities). The term "object" usually means the object as a whole with all of its sub-objects. If we use the term "entity" only one element of the object tree is meant. Otherwise the term object and entity are largely used equivalent.

If in the following the term "object" is used, usually the abstract definition of this object is meant (e.g. as the above Java class definition). A concrete "object instance" is the above patient "Hans Maier". It corresponds to one key value in the table defining the patient entity. Each object instance thus has a unique object ID.

Also, the term "key" is usually used to refer to the column in a table (in the relational database domain) or the corresponding member field of an object (in the object-oriented domain), as compared to a concrete "key value" (the value in a row in the corresponding column). A more sloppy use of those terms may be seen in other cases, thereby simply in both cases talking of a "key".

The term "iterator" is a common technical term and denotes a means which can be used to "iterate" through a set of elements (i.e. one can ask this iterator for an element, and, as soon as one has processed this element, one can ask the iterator for the next element).

According to one embodiment, there is provided a fast approach for processing a query on a plurality of object instances of an object in an object-oriented environment.

The object has a root object (e.g. a patient object) and a plurality of member fields (e.g. prescriptions, diagnosis, etc.). Some or all of the member fields may themselves be objects or arrays of objects so that they are sub-objects of the root object.

The root object and each sub-object correspond to an entity, which is represented by and stored in form of a table. The tables are in accordance with a relational model of data. One specific feature about the approach described herein is that the tables (the one corresponding to the root object and also the ones corresponding to sub-objects) have been sorted in accordance with the primary key of the table corresponding to the root object. Note, that the table corresponding to the root object is sorted with respect to the primary key of this table, while the table corresponding to sub-objects are sorted with respect to a column which is a foreign key in this table (not with respect to their own primary key—if there is one at all). In the following—just for simplicity—such tables, which are sorted in accordance with the primary key of the root object, are referred to as XTables.

This specific sorting of the tables enables a further processing of the tables such that the object instances can be generated in a particularly fast and efficient way. For that purpose, an incoming query is analyzed to identify those objects among the root object and the other sub-objects, which are necessary to execute the query. Usually not all of the objects, elements or entities are actually necessary for executing a specific query but only some of them. These are identified in the analyzing step.

Based on the identification of the necessary entities of the overall object to be populated for a certain primary key of the root object and further based on the specific sorting of the corresponding tables the approach then proceeds with the generation of object instances in a sparse manner. For that purpose, for each of the primary key values of the table corresponding to the root object the following is performed:

a) generating an instance of the object by populating the member fields of those objects among the root object and the sub-objects, which have been identified in the analyzing step as necessary for executing the query, with the data identified by the respective primary key in their corresponding tables, b) executing the query on the generated object instance; and c) adding the result computed on said object instance by executing said query to a result accumulator storage.

This means that the individual objects are generated sparsely "on the fly", the query is executed on them, and its result is added to a store for accumulating the results. In this manner, large datasets can be statistically queried based on sparse object generation in a highly efficient manner.

The approach according to one embodiment generates objects based on storing the source data in a specific tabular format. (According to a further embodiment, the data may be stored in tables of a relational database in a specific manner, namely such that they are sorted according to the primary key of the root object.)

According to one embodiment, the system or systems which store the tabular data have the capability of reading blocks of data from multiple such tables "in parallel synchronized on specific keys". What this means will be explained in detail later. As already mentioned above, the tables which are specifically sorted according to the primary key of the root object are referred to as "XTables" in the following.

In a first preparatory step, data are retrieved from a source system (e. g. a relational database, but other sources are also possible), and converted into such XTables, such that each XTable corresponds to one part (entity) of the overall object (the root object), which is to be analyzed. In our health example, one entity (the one corresponding to the root object) is the "Patient" with a corresponding XTable, another entity is the "Prescription" backed by or corresponding to another XTable etc. All those entities together form the object "Patient".

As mentioned, the source system may be a relational database, but it may also be a different data source, e.g. unstructured data in a large document store. The only prerequisite is that there needs to be a unique identifier available to identify the entities of an object. The most frequent source system, however, will be a relational database, and very often tables in the database will map one to one to corresponding XTables, with the XTables being the or corresponding to the "re-sorted" tables of the relational database such that they are sorted in accordance with the primary key of the root entity. In some cases, however, tables in the source database system need transformations while retrieving them in order to convert them into an XTable, namely the re-sorting of the rows in accordance with the primary key of the root object.

Once those XTables are generated they may serve for computing results for different sorts of queries. During that process object instances are generated and provided for processing in a way such that they include only those data, which are necessary to execute a certain query. In other words, based on a query analysis there is determined for a certain query, which entities (with the corresponding XTables) are necessary to execute the query. Then, in a next step, based on the XTables, there are object instances generated, which contain only those elements, which have been determined as relevant for executing the query. Based on the thus generated objects instances the query is executed.

According to one embodiment, the query logic is executed on a certain object instance as soon as it has been generated. The result is then stored in or added to a result storage. Once the object instance has thus been processed, this instance is "de-constructed" again (the associated memory is freed or the instance is made available for re-usage), and the method proceeds with the generation of the next object instance, executing the query on the next instance, and then in turn storing or adding the corresponding result into the result storage. Storing or adding results computed on one object instance may thereby—as an example—simply correspond to incrementing one or more counters, which serve as a basis for computing the result of the query. Thus, millions of object instances are generated "on the fly" and processed without ever having to physically hold more than one object instance in memory (or more than one object instance per thread used for parallel computing).

This will be explained by means of further embodiments in somewhat more detail below.

According to one embodiment the XTable stores data row by row, whereby rows are sorted according to the keys which define the object hierarchy (the root objects and recursive sub-objects). In the first preparatory step, data are retrieved from the source system (e.g. a relational database), sorted according to the respective keys and stored in multiple XTables (one for each element/entity of the object). Assuming an example like the "health database" described in the background section the object in focus of the analysis may e.g. be the "patient". The primary entity is the "Patient", and the patient has sub-objects corresponding to the entities "Prescription" and "Diagnosis". In this case all XTables (one for the patients, one for the prescriptions and one for the diagnoses) hold data sorted by the patient key or the patient ID such that consecutive rows form blocks with same patient key (see the FIG. 5).

In addition, one of the sub-objects might have member fields which in turn refer to other entities, e.g. the sub-object "Hospital Case" in turn refers to entities such as "Treatments" or "Diagnostic Procedures" (different sorts of events which happened within a hospital case). The object hierarchy (objects and nested sub-objects) would then contain the following entities and look like a tree with three levels:

"Patient", the entity at the root of the tree which holds the child entities:
  "Prescription"
  "Diagnosis"
  "Hospital Case", which holds the child entities
    Treatments
    Diagnostic Procedure Each of those entities has its corresponding XTable. All of those XTables are sorted by the patient key as the primary sorting criterion. The XTables for the entities "Treatment" and "Diagnostic Procedures" are in addition sorted by the "Hospital Case ID" (an ID which uniquely identifies a hospital case) as a second sorting criterion. That means those XTables have blocks of rows for each patient, and within each block there are sub-blocks of treatments or procedures for each hospital case of the patient. In the following we will for simplicity assume a non-nested object hierarchy. The generalization to a nested object hierarchies is mostly evident or will be explained where necessary.

In order to generalize this for nested hierarchies one may say that when an object is a sub-object in a nested object hierarchy such that it is a sub-object at an n-th sub-level of the root object, then the table corresponding to such a n-th sub-level sub-object is sorted a) using the foreign key column of the table corresponding to the primary key of the root object as a primary sorting criterion, and b) using the further keys of the table of the n-th level entity as further sorting criterions in accordance with the object hierarchy, i.e. a foreign key which corresponds to an entity on a higher level in the object hierarchy is ranking as a higher criterion during sorting (see the general definition below).

In the above the object "treatment" is at sub-level n=2 (counting the root level as n=0). There is only one sub-level above this sub-level n=2, which itself is a sub-object (the level n=1 "hospital case"), and therefore there is only one further sorting criterion, namely the key which corresponds to the entity "hospital case". If the hierarchy had even further levels than n=2 there would be further sorting criterions.

Figure 3:
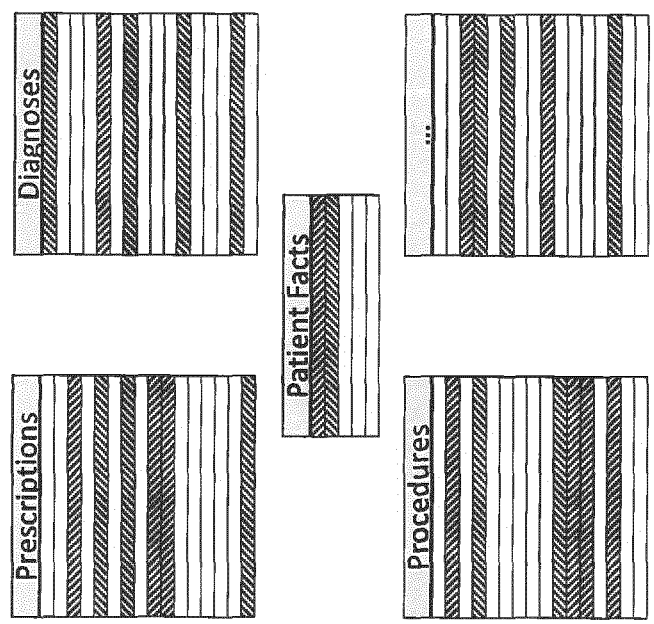
FIG. 3 schematically illustrates further database tables.
Figure 4:
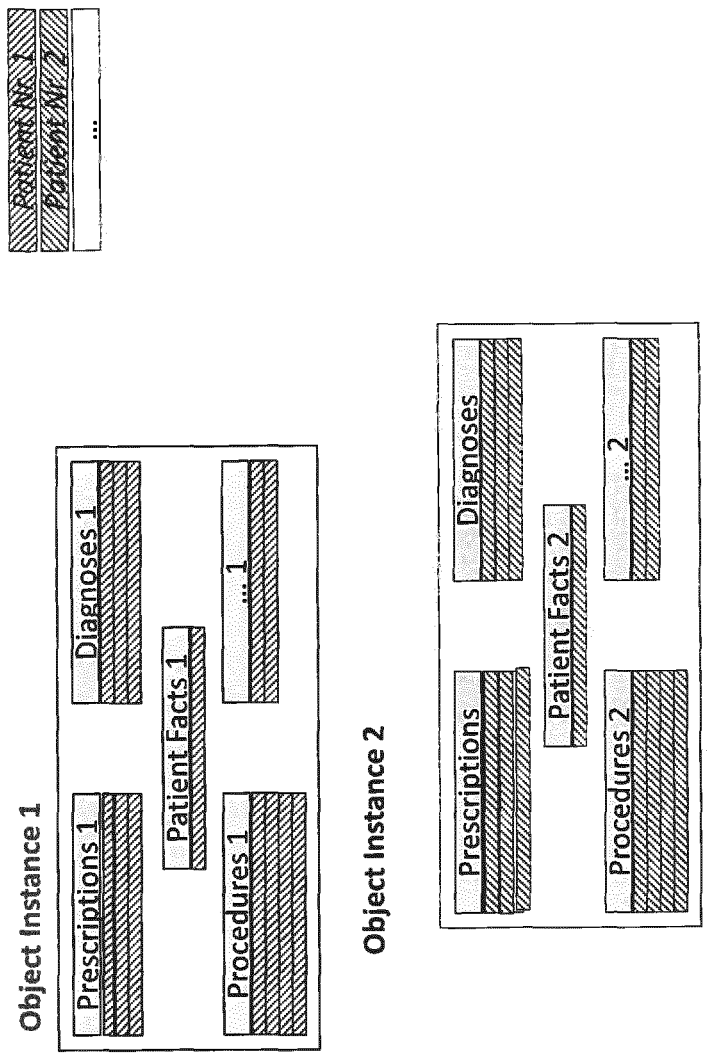
FIG. 4 schematically illustrates object instances.
Figure 5:
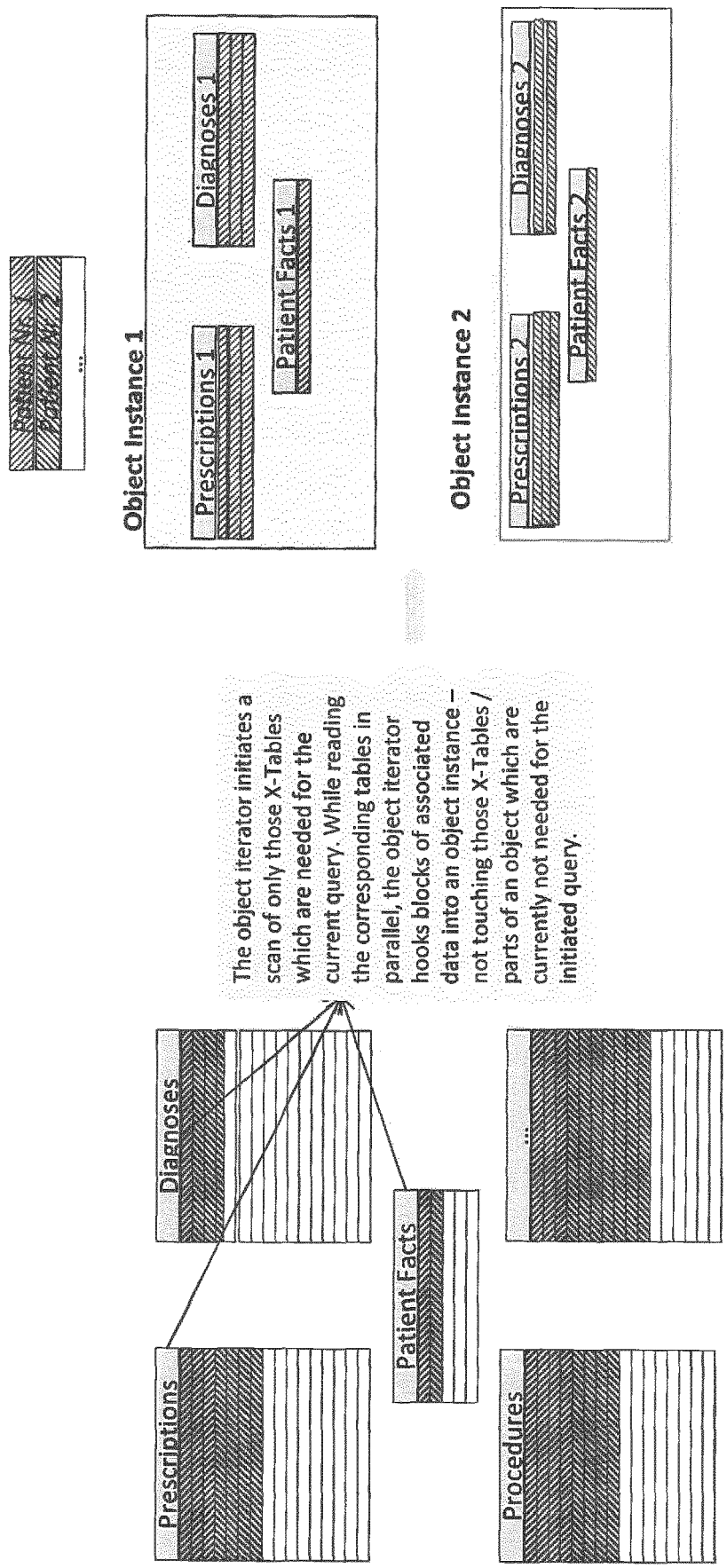
FIG. 5 schematically illustrates tables and object instances in accordance with an embodiment of the invention.

The sorting is schematically illustrated on the left-hand side in FIG. 5, which shows the tables of FIG. 3 sorted according to the key identifying the patient. In these tables, rows are respectively sorted by the same specific key (e.g. the patient key). This has the effect that the data, which belong to a certain object instance, are stored in successive rows (or blocks rows). In FIG. 5 one can recognize that the "Prescriptions" XTable has been organized such that the entries in the original source database table, which correspond to the three prescriptions of patient 1, form the first three rows in this XTable. The next four rows are the prescriptions, which correspond to patient 2. In a similar way the XTable then continues with prescriptions of patients 3, 4, 5, and so on, up until the prescriptions, which correspond to the last patient N in the patient facts table, assuming that this table contains N patients.

Similarly, the diagnoses XTable, which contains the diagnoses of various patients "scattered" across the original table as shown e.g. in FIG. 3, now contains the rows sorted such that at first come the diagnoses such that at first come the row(s) containing the diagnoses of patient 1, then the rows containing the diagnoses of patient 2, and so on, up until the rows containing diagnoses of patient N.

In the same manner the "Procedures" XTable and all other XTables corresponding to other entities of the object are prepared. All XTables finally hold data primarily sorted by the key which corresponds to the entity at the root of the object (the "Patient"). Note, that while the patient ID is a primary key in the patient XTable, is a foreign key in the other XTables. I.e. those tables are primarily sorted by a foreign key—i.e. rows with identical foreign keys are appearing in successive blocks. In case of a nested object hierarchy some of the sub-objects may in turn have a key, for example, the "Hospital Case" table may have a unique key "hospital case ID". This means that this XTable is primarily sorted by a foreign (!) key (the patient ID) and the key of this table (hospital case ID) is only the second sorting criterion.

In general sorting happens a as follows: Each entity and its XTable corresponds to a node in the object tree (see e.g. FIG. 6: The root of the tree is the entity "Patient" with 4 child entities. One of the child entities, the "Hospital Case", in turn has children). An XTable corresponding to an entity X in this tree is sorted by all parent entity IDs, whereby the priority starts from the root. E.g., if in this tree the path from the root entity to an entity B in the tree traverses the nodes
  Root Entity=>Entity A=>Entity X– . . .
then the corresponding XTables for entity X holds data sorted in this priority, i.e. primarily sorted by the root entity ID (a foreign key in this table), secondarily by the ID of entity A (also a foreign key in this table), then by the ID of entity X. Entities or XTables at the leafs of the tree do not need to be sorted with respect to their own primary key (if there is one at all).

After building XTables in this way, data is prepared to generate objects instances containing only those data entities of actual interest to the user. Which data elements are of actual interest thereby is determined based on the query. For an incoming query, it is determined which entities the query refers to (explicitly or implicitly). Only information from those entities resp. their XTables, which have been found relevant, will be used to generate object instances by instance. This can be done as follows, thereby again assuming the "health database" as an example, and assuming that in addition to the "Patient" the entities "Diagnosis" and rescription" have been determined as relevant.

For the first patient object the first row is read from the patient XTable corresponding to one patient ID. This row serves as the root of the object to be built. Then the process reads the corresponding blocks of rows from the other relevant XTables and inserts them into the patient object instance (assigns them to member fields of the root patient object). Thereby, instead of reading a block row by row for a given key value (the key value corresponding to the member field of the object instance to be populated), the XTable can be prepared to retrieve whole blocks of rows with identical key values (corresponding to the member field of the object instance to be populated) in a single operation, e.g. by simply only "hooking" a pointer into the root (patient) object instance which points at the block of rows. Only data from entities found relevant (in our example only "Prescription" and "Diagnosis") are hooked into an object instance—other member fields of the object are left void and corresponding data/XTables are not touched or do not need to be processed.

Using a pointer which just points to the rows of the table to be inserted into a specific object instance and writing this pointer onto the object instance rather than reading the table data and writing it explicitly and in full into the object instance storage improves the overall speed of the process drastically, because only the pointers need to be written rather than the whole rows of the tables, which requires less data to be transferred and to be written.

If one of the child entities found relevant in turn has relevant children (nested objects), then the object assembly is recursively continued. That means, sub-object instances are in the same manner populated with blocks of rows from their relevant children.

Once the first patient instance has been generated and has been processed, the second instance is generated. That means the next row from the patient XTable corresponding to the next patient ID and corresponding blocks of rows from other relevant XTables are read, and those blocks are assembled into the next object instance. Proceeding further object instance by instance is generated in correspondence with the keys based on which the XTables have been set up (sorted), until one object instance has been generated for each key value of the root entity (one object instance for each patient).

For the described approach it is preferable to be able to efficiently access blocks of identical key values. In the described embodiments this is achieved by organizing tables as XTables in the described way (i.e. sorting by keys corresponding to the path from the root entity to the entity an XTable is associated to). Furthermore—instead of reading blocks row by row and compare keys till one arrives at the beginning of a new block (a new key value)—there may in some embodiments be added additional information into an XTable, which makes it more efficient to retrieve whole blocks.

One may, for example, at the beginning of each block add information on the length of the block, thus not having to compare key values for each row to determine the start of the next block. In addition, in case data are held in RAM (random access memory), one may add indices which point at beginning of blocks and—instead of reading rows and writing the data into an object instance—one may then simply just hook those pointers into the object instances, thus not having to "move" data.

According to one embodiment there is provided in a table sorted according to said primary key of the root object, possibly according to further keys as further sorting criteria, an indexing data structure comprising pointers which respectively point at the beginning of each block having the same key, or point to one or more sub-blocks identified by further keys. This indexing structure may preferably comprise additionally information on the length of each block identified by a pointer. In this manner the data can be read more efficiently and the object instances can be generated more quickly.

Further, according to one embodiment multiple XTables are read "in parallel, synchronized on the given keys", i.e. once one block is read from one XTable, reading for this XTable needs to "go on hold" till all the other corresponding blocks are read from the other required XTables. For that purpose according to one embodiment there is provided a reading mechanism, which reads simultaneously multiple tables, and which further does not proceed with the reading of a next block of a table, the next block corresponding to a next key used as sorting criterion, until the corresponding row or block of rows of the other tables identified as necessary have been read.

As compared to known row-based or column-based tables (which are well known table types from a number of database implementations with specific data access properties) the table implementation of the embodiments provide specific properties, in particular the sorting as described before, so that they may be referred to as XTables. In addition those tables may have further properties, such as data access properties, which enables to use them for efficiently retrieving blocks of data in parallel from multiple tables synchronized on given keys. For that purpose the tables may have indices as described before identifying blocks of rows and to enable the indices to be used as pointers. Furthermore, there may be provided a specific access mechanism, which enables the reading of such tables in parallel, thereby further improving speed.

All such tables may be referred to as XTables. In its most broad interpretation, however, an XTable implementation is based on the above described specific organization of an XTable, which is based on sorting data according to keys with priority defined by the object hierarchy. Any further embodiment of an XTable with the mentioned data access properties may further enhance the basis for implementing an efficient, sparse object iterator.

With this approach, object instances are generated which hold only those elements (entities) which are actually required for answering a query. The term "elements", however, in another embodiment may not only refer to entities of an object or XTables as a whole, but it may also refer to specific columns of a XTables. In this case only the information of columns of (sorted) tables, which have been determined as relevant based on the query analysis, will be used for generating the objects. This means that not the complete rows of the XTables, which have been found relevant, are inserted into a certain object, but only the columns, which have been found relevant. To enable this, the preparatory step of sorting may include the step of splitting the tables into their individual columns, and then only the values of those columns, which have been determined as relevant, can be hooked or inserted into the object instances in an efficient manner.

Figure 6A:
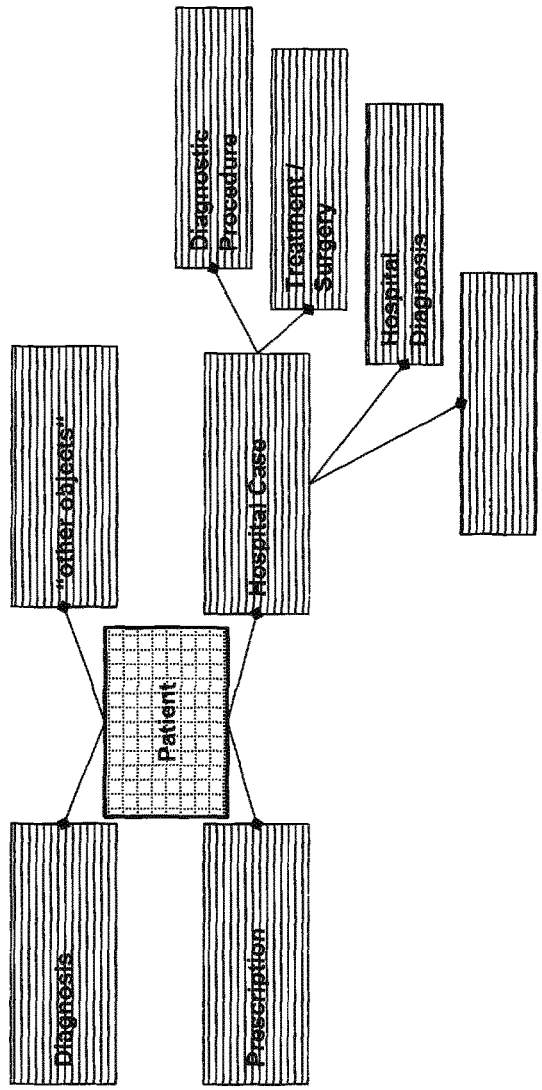
FIGS. 6A and 6B schematically illustrates tables and object instances in accordance with a further embodiment of the invention.
Figure 6B:
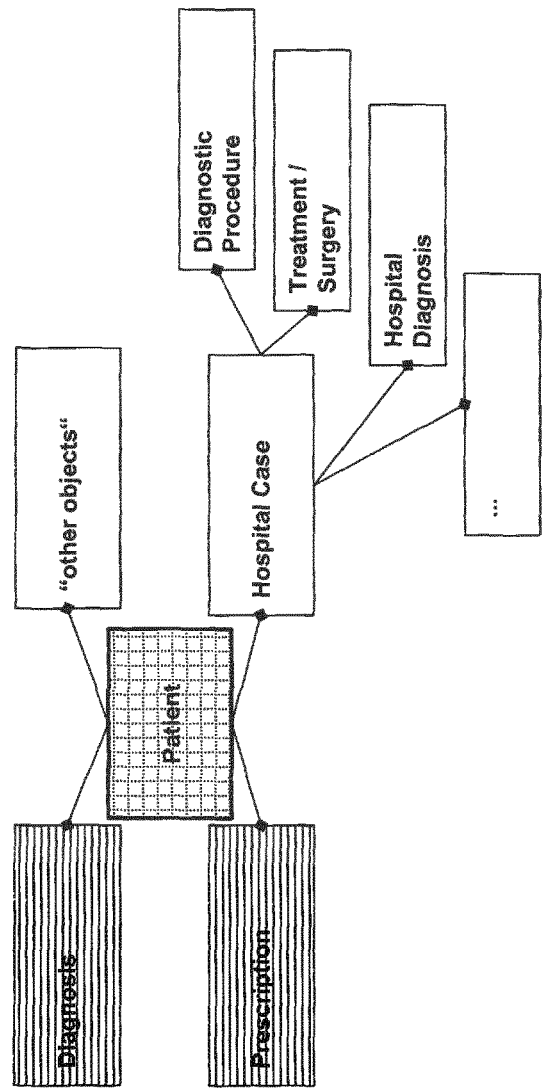

Now the operation of an embodiment will be further described. In a query example the user is confronted with the task to sum prescription costs for patients after repeated (second) diagnosis of hypertension: This query requires data only from the tables "Prescriptions" and "Diagnoses", and there is therefore no need to touch the many other data sources, such as procedures/treatments, hospital visits, etc. The object instances instead can be as sparsely populated as shown in FIGS. 5, 6A and 6B, which enables a fast execution of the query.

It should be noted here that it is known for the skilled person how to sort a table with respect to a key and store a table physically in that ordering. Most relational database systems can do this, and that is a common way to implement an indexed (accelerate) access with respect to that key. Embodiments illustrated herein, however, use XTables with specific sorting properties as described above (e.g. sorting according to the object hierarchy) to enable a generation of sparsely populated objects. Furthermore, described embodiments allow to efficiently compute query results, by at first determining which data elements are actually necessary to executed the query, and to then generate the object instances, by populating them with only those elements, which have been determined as necessary in the determining step.

According to further embodiments multiple such tables are read "in parallel synchronized on specific keys" thereby efficiently retrieving blocks of data as described above.

Classical relational database systems do not have the capability of "reading multiple M to N related tables in parallel" (even if data are sorted physically with respect to a key). Based on this synchronized reading and sparse building of object instances, the execution of queries on very large data sets respectively sets of complex objects can be drastically improved.

A means to conveniently traverse through all (selected) object instances is an "iterator" software design pattern—in our case a "object instance iterator". This iterator delivers instance by instance by calling the methods "hasNext" and "next". Once an instance is processed the next instance is requested form the iterator, and this request triggers the assembly of the next object instance. Any other software design pattern, however, which serves the same purpose would do as well. Here, the term "iterator" is meant representative for any such approach.

The embodiments of the approach analyze a query and determine which parts of an object to be built from relational database tables are actually needed for computing the query result. Then only those data elements in the relational database (i.e. only those tables or columns) which are determined as relevant and necessary are touched in the (possibly simultaneous) reading and object building. Only those parts of an object are built which are required.

According to one embodiment for each value, which the specific key used as sorting criterion may assume, a corresponding object is generated by filling it with the relevant elements, which have been determined in the determining step.

According to one embodiment this approach may be implemented by multiple processes/threads doing this in parallel. E. g. the first thread may be used for processing key/object/patient 1 to x, the second x+1 to y, the third y+1 to z. In that way it becomes possible to process objects in parallel in a multi-core/multi-processor architecture, or even on a server farm.

In the following further embodiments will be described in connection with FIG. 6.

As a result of sparse object building a very complex data schema, which otherwise would require very expensive joins, is becoming feasible for a holistic analysis. FIG. 6A. depicts a scenario where the object "Patient" has multiple sub-objects which are recursively nested: The sub-object "Hospital Case" in itself is an object which contains sub-objects such as "Diagnostic Procedures", "Treatments/Surgeries" etc. Each of them may in turn contain sub-objects; a surgery may in turn have heart rate measurements or lab values taken along the surgery (not depicted). And there might be many other data streams attached to the patient (exemplary depicted as "other objects" in FIG. 6) such as "Nutrition Information", "Genetic Information" or "Gene Expressions Measurements". The "Patient" as a whole might represent a very large and complex object.

Assume that in a scenario as depicted in FIG. 6 a user might want to sum all prescription costs for patients after they had a repeated hypertension diagnoses (i.e. more than 2 hypertension diagnosis). In pseudo code the corresponding query reads like:

```
For each Patient
   WHERE (Patient.Number_Hypertension_Diagnoses > 1) :
   SUM (Prescription.Costs WHERE Prescription.Date >
   Date_Hypert_Diagnosis)
```

Relational databases with a corresponding complex table schema will require expensive joins (and nested SQL queries) and are computationally very expensive for such complex analytical requirements. Storing such huge object instances as a whole in an object oriented database would result in retrieving those huge instances and lots of unnecessary data, even if just parts of them are required. The above query would obviously require only the entity "Patient" at the root as well as the entities "Diagnosis" and "Prescription" as a part of the object. On the one hand, it is desired to have those data be presented in an object-oriented manner so to work efficiently with more complex objects, on the other hand, however, it is desired to populate object instances only with elements which are required for the problem at hand, so not to touch unnecessary data.

The embodiments described herein exactly serve this purpose and in this respect are fundamentally different to existing relational as well as object-oriented databases. The approach is illustrated in FIG. 6B. Depending on the query not all of the sub-objects, which could potentially be included into an object, may be necessary to execute the query. This is illustrated in FIG. 6B, in which the sub-objects "Hospital Case" and "other objects" are not included. Instead, in addition to the root object "Patient" and the sub-objects "Prescription" and "Diagnosis" further sub-objects could theoretically be included in the object instances to be generated (such as the objects "Procedures", and "other objects"), however, since for the processing of the incoming query they are not relevant, they are actually not included. This is because the above query does not require any of the other sub-objects. While iterating through all patient object instances to compute the result to the above query, the object iterator therefore builds only "partial patient object instances" compared to a maximum object including all potential other sub-objects. The non-required sub-objects are just left void.

In the following there will be described how according to some embodiments it may be determined, which elements are to be included into the objects, which are to be generated.

An object contains a number of entities (or object elements—see FIG. 6 for an example), each of those entities having a corresponding XTable. The goal is to determine the set of entities which are relevant for a query, such that only data from those XTables are hooked into the object instances while an iterator traverses all instances to compute the query result.

In an object-oriented query language, each query refers to a number of properties of an object or of its sub-objects. As an example there is again used the above query

```
For each Patient
   WHERE (Patient.Number_Hypertension_Diagnoses > 1) :
   SUM (Prescription.Costs WHERE Prescription.Date >
   Date_Hypert_Diagnosis)
``` and it is assumed that the object "Patient" is structured as depicted in FIG. 6. The property "Date of Prescription", for example, is a property of the entity "Prescription". Obviously, if a query refers to the property "Date of Prescription" as a parameter, then the associated entity "Prescription" (or its relevant column(s)) needs to be included into the object assembly. From this it becomes apparent that according to one embodiment the determination which elements/entities to be included into the objects may be made by determining which properties are referred to in the query and by identifying the associated entities of those properties as relevant entities.

It should further be noted that the object elements/entities which are required not necessarily need to include all properties/columns of the XTables, for which one of its the properties has been found relevant when analyzing the query. The sub-object may also just include those property respectively corresponding column of the XTable, which has been referenced in the query or found relevant.

That means, according to one embodiment in a first step, the determination algorithm adds all entities to the set of required entities which hold a property, which has been directly referenced in the query. The example query

```
For each Patient
    WHERE (Patient.Number_Hypertension_Diagnoses > 1) :
    SUM (Prescription.Costs WHERE Prescription.Date >
    Date_Hypert_Diagnosis)
``` refers to the "Date of Prescription" and "Cost of Prescription" as parameters, and obviously the entity "Prescription" needs to be in the set of required entities. Furthermore, the query refers to the property "Number Hypertension Diagnoses", or more precisely "Number Hypertension Diagnosis of Patient". This property is a property of the entity "Patient"—it describes the patient and patients are filtered (selected) based on that property (only patients with more than 1 such diagnosis are to be considered in the query). Therefore, also the entity "Patient" needs be in the set of required entities.

Some of the properties referenced directly, however, might require properties from other sub-objects/entities to compute their value. The property "Number Hypertension Diagnoses", for example, is a property of the patient, however, it internally refers to the "Diagnosis" entity: It counts the number of diagnosis of a certain type (of type "hypertension"). Therefore the "Diagnosis" entity is referred to "implicitly", and it also needs to be included into the set of required entities.

According to one embodiment the algorithm in a first step adds all entities to the set of required entities which hold properties which are explicitly referenced by the query. It then analyzes each of those properties to determine which other properties and entities it depends on to determine their result value; those implicitly referenced properties and entities are also added to the set of required properties/entities. The algorithm continues recursively to collect all required entities.

In one embodiment a technically implementation of this algorithm can be achieved by defining an "abstract interface" which each new property which is added to an object has to fulfill. This interface requires each property to implement a method "getRequiredProperties( )", which returns the list of other properties it depends on. If a developer defines a new property (or type of property) he has to provide an implementation of this mandatory method. Based on that a recursive collection of all required properties and their entities can be initiated, simply by calling this method for all directly referenced properties, which in turn call this method for all dimensions they depend on, etc. In this manner a recursive call stack is built which finally collects all required properties and associated entities.

In the following some general comments are made with respect to the approach described before.

Storing data in terms of objects or preparing data in terms of XTables with specific sorting properties as described before to quickly assemble the desired objects has the disadvantage that one needs to decide which object is in focus of the analysis. The way data are stored by such an approach isn't as generic any more as in a relational database: a relational database does not (or not necessarily) make any assumptions on a later analytical focus. The advantage of such an object-oriented approach, however, is that the object in focus of analysis can be analyzed much more "holistically", i.e. any related entities and their properties can be easily "joined" into the analysis.

Another advantage is that, if one has made a choice which object is in focus of the analysis (e.g. the patient), and one has stored the data in a corresponding object-oriented way or prepared in corresponding XTables, then parallel execution of algorithms becomes feasible—simply by partitioning along object instances: If one has N object instances stored (i.e. N patients) and one would like to execute an algorithm in K parallel threads (e.g. on K cores of a multi-core processor or K different processors/computers), then one can simply Assign sub-sets of then N object instances to the K threads Each thread computes the result on its assigned sub-set Results on sub-sets are finally "reduced" to an overall result.

In terms of the above example query which sums costs for patients after repeated hypertension diagnosis, each thread computes costs for valid patients in its sub-set of patients. Finally, costs for all sub-sets of patients are summed to obtain the overall costs. The last step may be called the "reduce" step, as it is reducing the results from multiple sub-sets to one final result.

Figure 7:
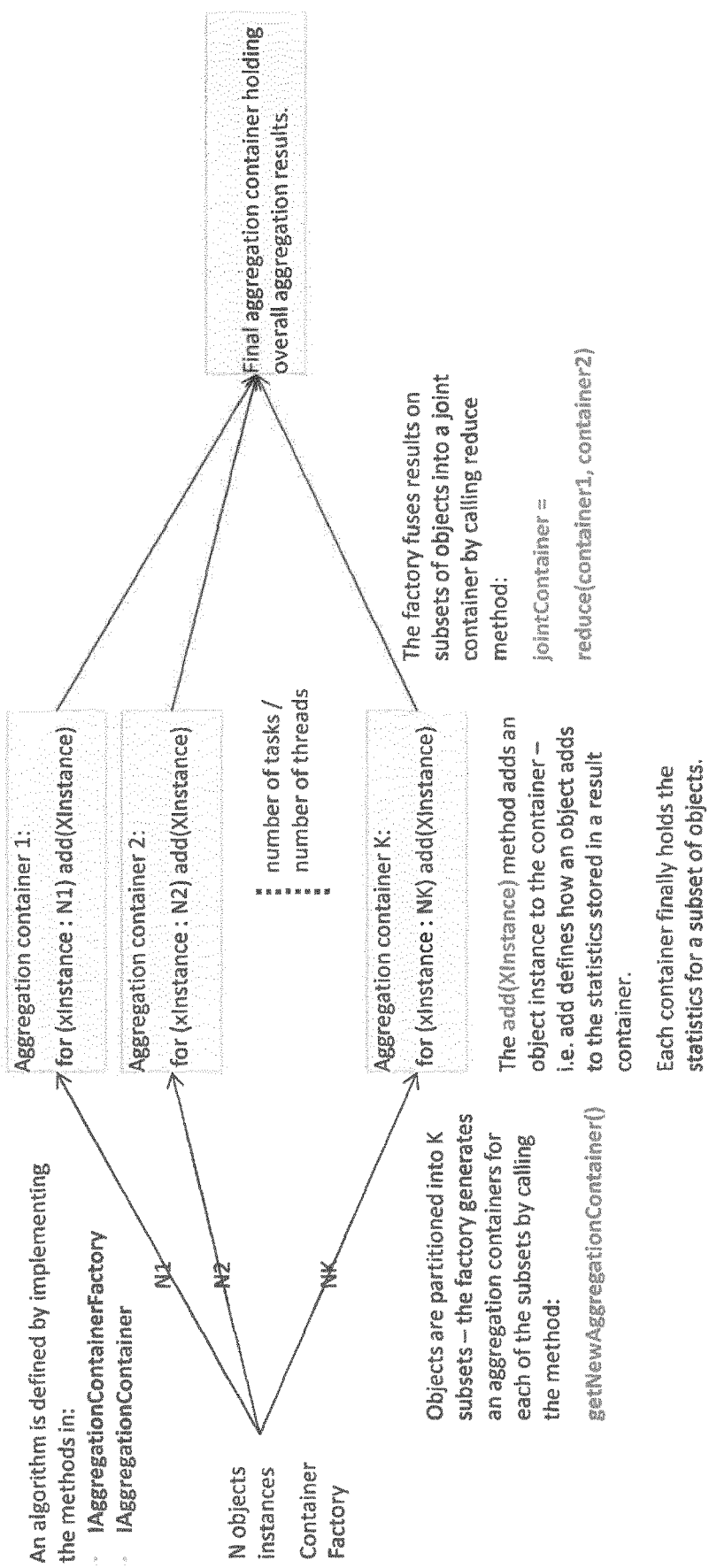
FIG. 7 schematically illustrates a method in accordance with an embodiment of the invention.

In a more generic setting, an algorithm basically requires to implement two abstract methods, the "add-method" and the "reduce-method". The add-method defines how each single object instance contributes to the results of an algorithm (e.g. how each patient adds to an aggregation result). The reduce-method defines how results on different sub-sets of object instances are consolidated into one overall result. Implementing an algorithm based on the object oriented storage (or based on XTables for quickly assembling objects) simply means defining the add- and the reduce-method. FIG. 7 provides more details on this generic approach.

Assume that there are N objects, corresponding to N values of the root object key. Then these N objects may be divided into K subsets N1, N2, . . . NK as illustrated in FIG. 7. For each of those subsets and "aggregation container" is set up, an instance of specific class which holds aggregation results. For each of the sub-sets an iterator traverses the object instances in this subset and—via the add-method—aggregates the corresponding object instances to the results in the aggregation container. Thereby different iterators are run on different threads to distribute the computation load on different cores. Once all containers are "filled" with their subset results, the different containers are reduced to a final result container. This then results in a final aggregation container holding overall aggregation results.

Formally setting up/creating new containers (the getNewAggregationContainer( )-method depicted in FIG. 7) and reducing multiple containers to one container (reduce( )-method) can be defined as an abstract method of an "AggregationContainerFactory" (one part of the abstract algorithm interface), while the add method would be a method of the AggregationContainer itself (a second part of the abstract algorithm interface).

In the foregoing embodiments have been described using database tables containing health information. The skilled person, however, will readily recognize that the described approach can in principle be applied to any database data, independent of their concrete content, and other concrete examples are:

Customer data: The object in the focus of analysis is the "customer", and attached to the customer are various data streams/entities, e.g.:
  transactions: products sold to the customer
  website visits, where each visit in turn might be a complex object composed of clicks (page views), placed advertisements, . . .
  campaign information
  email transactions with the customer Machine data: The object in focus of analysis might be the "automobile" with data streams such as
  List of components the machine is assembled from
  Sensor readings during operation
  Garage visits with failure and diagnosis data
  Maintenance information, e.g. spare part replacements The skilled person will understand that the concepts and embodiments described herein enable the faster execution of a query processing on a plurality of instances of an object than with previous approaches. The embodiments of the invention may be implemented by software, by hardware, or by a combination of both. In any case the described embodiments enable a faster processing requires less computational power than the approaches before, and they therefore directly relate to the operation of a computer and its processing speed. As a consequence the concepts and embodiments described herein solve the technical problem of enhancing the processing speed of a computer when performing a query processing on a plurality of instances of an object.

The invention claimed is:

1. A computer-implemented method of processing a query, said method comprising:
  receiving a query; and
  processing said query on a plurality of instances of an object of an object-oriented environment, wherein said object has a root object and a plurality of member fields, among which a plurality of the member fields themselves are objects thereby being sub-objects of said root object, wherein said root object and each sub-object correspond to an entity represented by and stored in form of a table having a primary key, wherein said tables are tables in accordance with a relational model of data, and wherein each of said tables corresponding to said root object or to one of said sub-objects has been sorted in accordance with the primary key of the table corresponding to said root object, which is a primary key in the table corresponding to said root object but is a foreign key in said tables corresponding to said sub-objects, so that all tables corresponding to said sub-objects are sorted with respect a column which is a foreign key in the tables corresponding to said sub-objects, said step of processing said query comprising:
  analyzing said query to identify those objects among said root object and said sub-objects which are necessary to execute the query; and
  for each value of the primary key of the table corresponding to said root object:
    i) generating an instance of said object by populating the member fields of those objects among said root object and said sub-objects which have been identified in said analyzing step with data identified by the respective primary key in their corresponding tables;
    ii) executing the query on the generated object instance; and
    iii) adding a result, which has been computed by executing said query on said object instance to a result accumulator storage,
  wherein said step of identifying those objects which are necessary to execute the query comprises:
    identifying member fields which are explicitly or implicitly referred to in said query;
    identifying the objects which correspond to the identified member fields as those objects which are necessary to execute said query.

2. The method of claim 1, wherein an implicitly referred member referred by a certain member field implicitly is another member field, on which said certain member field depends to determine its result value.

3. The method of claim 2, wherein only those member fields, which have been identified in said identifying step, are populated with data from their corresponding tables.

4. The method according to claim 1, wherein:
  the query logic is executed on an object instance as soon as the object instance has been generated and the result is then stored in or added to a result storage;
  once the object instance has thus been processed, the associated memory of said instance is freed or the instance is made available for re-usage; and
  the method proceeds with the generation of the next object instance, executing the query on the next instance, and then in turn storing or adding a corresponding result of the next instance into the result storage.

5. The method according to claim 1, wherein:
  when an object is a sub-object in a nested object hierarchy such that it is a sub-object at an n-th sub-level of the root object, said root object has a primary key, said sub-object having a plurality of keys, one of them corresponding to the primary key of the root object, and the further keys not corresponding to the primary key of the root object, then the table corresponding to such a n-th sub-level sub-object is sorted:
  a) using the primary key of the table corresponding to the primary key of the root object as a primary sorting criterion; and
  b) using the further keys of the table of the object corresponding to the n-th sub-level as further sorting criterions in accordance with the nested object hierarchy, where a key which corresponds to a higher rank in the nested object hierarchy corresponds to a higher rank sorting criterion.

6. The method according to claim 1, wherein populating an object instance member field comprises:
  using a pointer which points to one or more rows of the table to be inserted into a specific object instance; and
  writing said pointer into the specific object instance.

7. The method according to claim 6, wherein if one of the objects which are necessary to execute the query in turn has relevant children, then the object instance generation is recursively continued such that sub-object instances are in the same manner populated with rows or blocks of rows from of tables corresponding to the relevant children.

8. The method according to claim 1, further comprising generating additional object instances in correspondence with the keys based on which the tables corresponding to the objects have been sorted, until one object instance has been generated for each key value of the root object.

9. The method according to claim 1, wherein:
the root object has a primary key;
in a table sorted according to said primary key of the root object, according to further keys as further sorting criteria, there is provided an indexing data structure comprising pointers which respectively point at the beginning of each block having the same key, or point to one or more sub-blocks identified by further keys; and
said indexing data structure further comprises information on a length of each block identified by a pointer.

10. The method according to claim 1, further comprising providing a reading mechanism, which reads simultaneously multiple tables, and which further does not proceed with the reading of a next block of a table, the next block corresponding to a next key used as sorting criterion, until the corresponding row or block of rows of the other tables corresponding to those objects, which have been identified as necessary to execute the query, have been read.

11. The method according to claim 1, further comprising:
implementing said method by n processes or threads, wherein:
values of keys used as sorting criterion are split into n subsets, each consisting of a set of sequentially ordered values of said key;
a first process or thread reads data corresponding to the first subset of the values of said keys;
a second process or thread reads data corresponding to the second subset of the values of said keys; and
an n-th process or thread reads data corresponding to the n-th subset of the values of said keys.

12. The method of claim 11, further comprising:
generating an aggregation container for each subset, said aggregation container including a method which generates, for each object instance in said subset, a result which adds to the result stored in a result container corresponding to said subset;
fusing by a fusing method the contained in said result containers into an overall result.

13. The method of claim 1, wherein said query is formulated in an object-oriented query language.

* * * * *